(12) United States Patent
Lee et al.

(10) Patent No.: US 9,772,671 B1
(45) Date of Patent: Sep. 26, 2017

(54) LOW-POWER ALARM DETECTOR

(71) Applicant: Climax Technology Co., Ltd., Taipei (TW)

(72) Inventors: Pin-Chia Lee, Taipei (TW); Ku-Fang Wang, Taipei (TW)

(73) Assignee: CLIMAX TECHNOLOGY CO., LTD., Taipei (TW)

(*) Notice: Subject to any disclaimer, the term of this patent is extended or adjusted under 35 U.S.C. 154(b) by 0 days.

(21) Appl. No.: 15/203,879

(22) Filed: Jul. 7, 2016

(51) Int. Cl.
| | | |
|---|---|---|
| G08B 23/00 | (2006.01) | |
| G06F 1/32 | (2006.01) | |
| G08B 25/00 | (2006.01) | |
| G08B 1/08 | (2006.01) | |

(52) U.S. Cl.
CPC .......... G06F 1/3206 (2013.01); G06F 1/3234 (2013.01); G08B 25/008 (2013.01); G08B 1/08 (2013.01)

(58) Field of Classification Search
CPC ... G06F 1/3206; G06F 1/3234; G08B 25/008; G08B 1/08
See application file for complete search history.

(56) References Cited

U.S. PATENT DOCUMENTS

| | | | | |
|---|---|---|---|---|
| 4,099,168 A * | 7/1978 | Kedjierski | ......... | G08B 13/1672 307/117 |
| 4,531,115 A * | 7/1985 | Black | ........................ | G08B 1/08 340/527 |
| 4,617,555 A * | 10/1986 | Sheiman | ................... | G08B 1/08 340/531 |
| 5,012,223 A * | 4/1991 | Griebell | .................... | G08B 1/08 340/531 |
| 5,432,755 A * | 7/1995 | Komninos | ................ | G01H 3/12 367/135 |
| 5,999,089 A * | 12/1999 | Carlson | ...................... | G08B 1/08 340/328 |
| 6,538,570 B1 * | 3/2003 | Smith | ................. | G08B 13/1672 340/550 |
| 7,315,244 B2 * | 1/2008 | Carmichel | ................ | G08B 3/10 340/521 |
| 7,656,287 B2 * | 2/2010 | Albert | .................. | G06F 19/3418 340/517 |
| 9,384,641 B2 * | 7/2016 | Zhevelev | ................ | G08B 13/04 |
| 2004/0145467 A1 * | 7/2004 | Roby | ........................ | G08B 1/08 340/531 |
| 2006/0012478 A1 * | 1/2006 | Carmichel | ................ | G08B 3/10 340/552 |
| 2007/0008125 A1 * | 1/2007 | Smith | ................... | B60R 25/1009 340/566 |
| 2010/0043526 A1 * | 2/2010 | Helwegen | ........... | G01N 21/1702 73/24.02 |

(Continued)

*Primary Examiner* — John A Tweel, Jr.
*Assistant Examiner* — Adnan Aziz
(74) *Attorney, Agent, or Firm* — McClure, Qualey & Rodack, LLP (57) ABSTRACT

An alarm detector for use in an alarm detection system is provided. The alarm detector includes: a microphone, a processor, and a sensing circuit. The microphone is for detecting an incoming acoustic signal. The sensing circuit is for determining whether the incoming acoustic signal comprises a specific audible alarm, and awakening the processor into a working mode from a sleep mode upon determining the incoming acoustic signal comprises a specific audible alarm.

5 Claims, 8 Drawing Sheets

(56) References Cited

U.S. PATENT DOCUMENTS

| | | | | |
|---|---|---|---|---|
| 2011/0187541 A1* | 8/2011 | Noguchi | ............... | G10K 9/122 340/628 |
| 2012/0146727 A1* | 6/2012 | Cyrusian | ............... | H03F 3/2173 330/261 |
| 2013/0003995 A1* | 1/2013 | Poulsen | ............... | H03F 1/0272 381/121 |
| 2014/0249825 A1* | 9/2014 | Proud | ............... | G08C 17/02 704/275 |
| 2016/0098921 A1* | 4/2016 | Qutub | ............... | G06F 1/3206 367/197 |

\* cited by examiner

LOW-POWER ALARM DETECTOR

BACKGROUND OF THE INVENTION

Field of the Invention

The present invention relates to alarm detection, and in particular, to an alarm detection system using a low-power alarm detector.

Description of the Related Art

Smoke and Carbon Monoxide (CO) detectors perform an important service in saving lives of building occupants, by detecting fires and/or poisonous gases, and by sounding an audible alarm. But when building occupants are not present or otherwise incapacitated, many smoke or CO detectors are useless as nobody can hear the alarm or act upon it, allowing fire and poisonous gas to expand unchecked, causing significant property damage and threatening lives. Some available alarm systems attempt to address this issue by deploying an expensive and complicated array of special dedicated smoke and/or CO detectors. These are hard-wired or otherwise interconnected to a central control system, which notifies third party dedicated personnel who in turn notify the remote user or emergency services. Such systems require expensive professional installation and a subscription for the monitoring and response service.

Other systems exist which comprise an intelligent smoke detector with the ability to provide notification directly to the remote user through a cellular phone service. Such systems require replacing existing smoke detectors with a dedicated intelligent device. As National Fire Protection Association (NFPA) codes require smoke detectors in each bedroom and on every floor, there are usually several smoke detectors in the building. Replacing legacy smoke detectors with dedicated intelligent devices is complicated and expensive. These systems also require purchasing and maintaining SIM cards and contracts with cellular providers.

In addition, an alarm detector deployed in a conventional alarm detection system comprises a processor to detect whether an incoming acoustic signal includes a specific audible alarm. However, the alarm detector is usually powered by a battery, and thus power consumption is of great concern for the battery-powered device. Also of great concern is the replacement of the battery in the alarm detector within several years. More specifically, the processor in the conventional alarm detector has to stay in the working mode all the time so as to consistently determine whether the incoming acoustic signal includes a specific audible alarm, resulting in higher consumption and a much shorter battery life. Accordingly, there is demand for a low-power alarm detector that can be used in an alarm detection system with extended battery life.

BRIEF SUMMARY OF THE INVENTION

A detailed description is assuming in the following embodiments with reference to the accompanying drawings.

In an exemplary embodiment, an alarm detector for use in an alarm detection system is provided. The alarm detector includes: a microphone, a processor, and a sensing circuit. The microphone is used for detecting an incoming acoustic signal. The sensing circuit is used for determining whether the incoming acoustic signal comprises a specific audible alarm, and awakening the processor into a working mode from a sleep mode upon determining that the incoming acoustic signal comprises a specific audible alarm.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
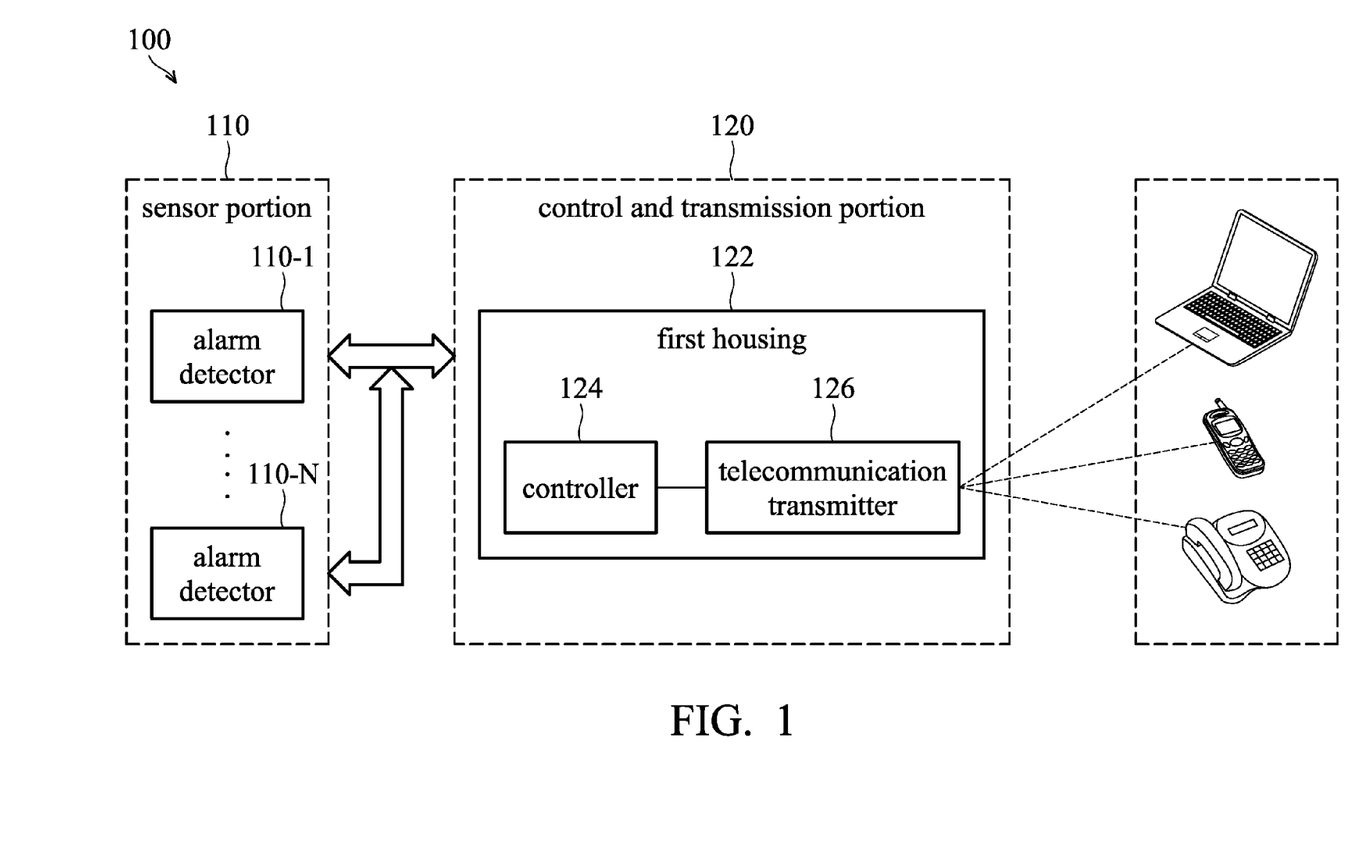
FIG. 1 is a block diagram of a system for detection and identification of an alarm in accordance with an embodiment of the invention.

FIG. 1 is a block diagram of a system for detection and identification of an alarm in accordance with an embodiment of the invention. The system 100 is capable of detecting and identifying an alarm from existing smoke or CO detectors nearby. The system 100 includes a sensor portion 110 and a control and transmission portion 120. The sensor portion 110 is for detecting one or more specific acoustic alarm patterns from various incoming acoustic signals, and transmitting an alarm notification signal to the control and transmission portion 120 via a low power wireless protocol, such as the Zigbee or Bluetooth Low Energy (BLE) protocols, upon detecting one of the specific acoustic alarm patterns.

The control and transmission portion 120 is for transmitting alarm message signals to equipment, such as a mobile phone, a personal computer, or a telephone, of a remote user after receiving the alarm notification signal from the sensor portion 110. The control and transmission portion 120 may be arranged in a first housing 122, and includes a controller 124 and a telecommunication transmitter 126. For example, the controller 124 may be a central processing unit (CPU), a microprocessor (MCU), a system-on-chip (SoC), or any other equivalent circuits capable of controlling the telecommunication transmitter to transmit an alarm message to a user's equipment such as a mobile phone, personal computer, or telephone, but the invention is not limited thereto.

In an embodiment, the telecommunication transmitter 126 can be an Internet-connected device, a cellular-connected device, and/or a phone dialer. For example, when the telecommunication transmitter 126 is a cellular connected device, the telecommunication transmitter 126 is capable of routing the alarm message signal generated by the controller 124 over a telecommunications network using the EDGE, GSM, GPRS, 3G, 4G, or any other cellular telecommunications protocols. In the embodiment, the alarm message signal may include a mobile phone short message service (SMS).

In another embodiment, when the telecommunication transmitter 126 is an Internet-connected device (e.g. a household PC, tablet PC, smartphone, etc.), the telecommunication transmitter 126 is capable of sending the alarm message signal generated by the controller 124 using the Internet. For example, the telecommunication transmitter 126 is connected to the Internet using a cable, DSL, dial up service, etc. In the embodiment, the alarm message signal may include an email, an email-to-SMS, and/or a message published on one or more social networks such as Twitter, FACEBOOK, GOOGLE+, etc.

In yet another embodiment, when the telecommunication transmitter 126 is a phone dialer using plain old telephone (POTS) or public service telephone network (PTSN) protocols, the telecommunication transmitter 126 is capable of initiating a phone call to a designated phone number of the user via the telephone network. At the remote user location, there may be any type of receiving device including a PC, a cellular phone or smartphone, or a telephone.

For example, the alarm message signal may include a text message, a mobile phone short message service (SMS), an email, a telephone message, The sensor portion 110 may include one or more alarm detectors 110-1~110-N, where each alarm detector is arranged in a second housing that may be separate from the first housing. In some embodiments, the sensor portion 110 and the control and transmission portion 120 are arranged in the same housing.

Figure 2:
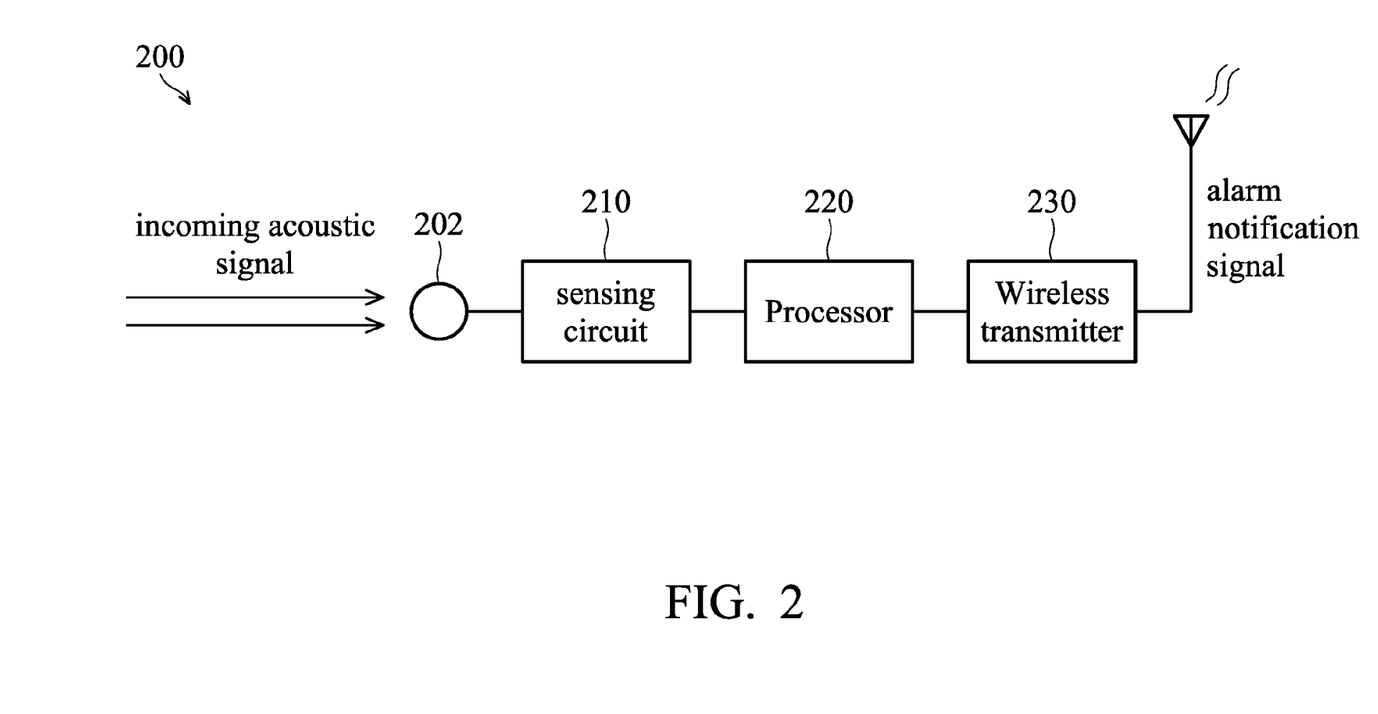
FIG. 2 is a schematic block diagram of an alarm detector in the sensing portion of the system 100 in accordance with an embodiment of the invention.
Figure 7:
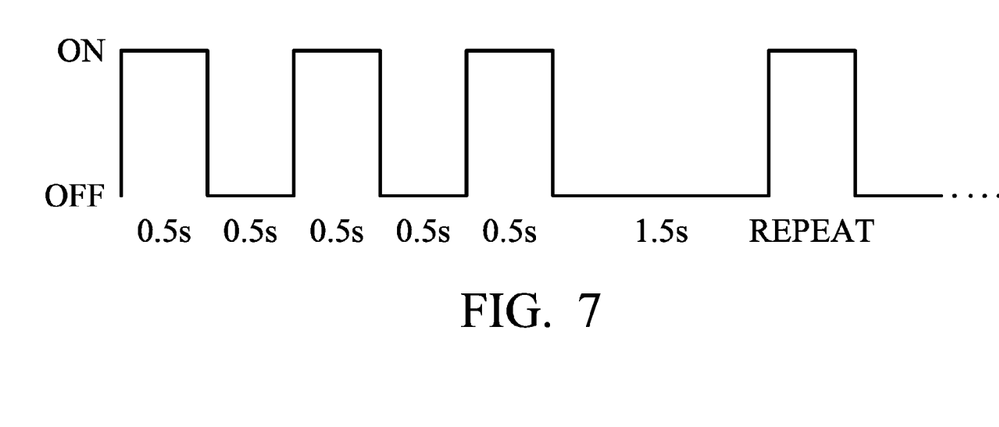
FIG. 7 is a waveform diagram of Temporal Three (T3) pattern defined in the NFPA 72 code and ANSI 53.41 standard.
Figure 8:
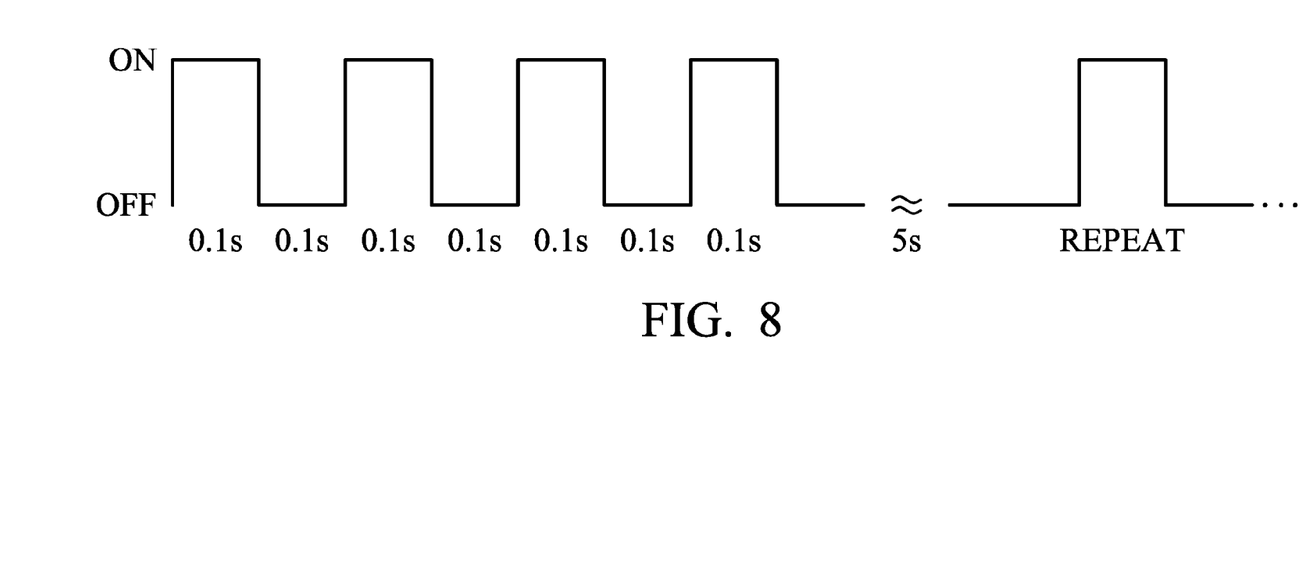
FIG. 8 is a waveform diagram of Temporal Four (T4) pattern defined in the NFPA 720 standard.

FIG. 2 is a schematic block diagram of an alarm detector in the sensing portion of the system 100 in accordance with an embodiment of the invention. Referring to both FIG. 1 and FIG. 2, the alarm detector 200 may be one of the alarm detectors 110-1~110-N in the sensor portion 110 in FIG. 1. The alarm detector 200 may include a microphone 202, a sensing circuit 210, a processor 220, and a wireless transmitter 230. The microphone 202 is configured to receive an incoming acoustic signal. The sensing circuit 210 is primarily for detecting a specific acoustic alarm pattern from the incoming acoustic signal that may include noises. The processor 220 may be a central processing unit (CPU), a microprocessor (MCU), or any other equivalent circuit. In addition, the sensing circuit 210 may also control the power status of the processor 220. It should be noted that one alarm detector is usually designed for a specific acoustic alarm pattern (e.g. Temporal Three (T3) pattern in the NFPA 72 code and ANSI 53.41 standard, as shown in FIG. 7), and another alarm detector is required for another specific acoustic alarm pattern (e.g. Temporal Four (T4) pattern in the NFPA 720 standard, as shown in FIG. 8).

It should be noted that the alarm detector 200 is powered by a battery (not shown in FIG. 2), and thus the power consumption is of great concern for a battery-powered device. Specifically, the processor 220 may stay in a sleep mode or a low-power mode until a rising edge of a sound pattern signal is detected by the sensing circuit 210, thereby minimizing the power consumption of the alarm detector 200 and increasing its battery life. Upon detecting a rising edge of sound pattern, the sensing circuit 210 may awaken the processor 220 into a working mode from the sleep mode or the low-power mode, and the processor 220 may determine if the width of the sound pattern matches the pattern of a specific acoustic alarm signal from the sensing circuit 210. If it is determined that the width of the sound pattern matches the pattern of a specified acoustic alarm signal, the processor 220 may activate the wireless transmitter 230 to send an alarm notification signal to the control and transmission portion 120 via a low power wireless protocol, such as the Zigbee or Bluetooth Low Energy (BLE) protocols. The detailed operations of the sensing circuit 210 of the alarm detector 200 will be described in the following embodiment of FIG. 3.

Figure 3:
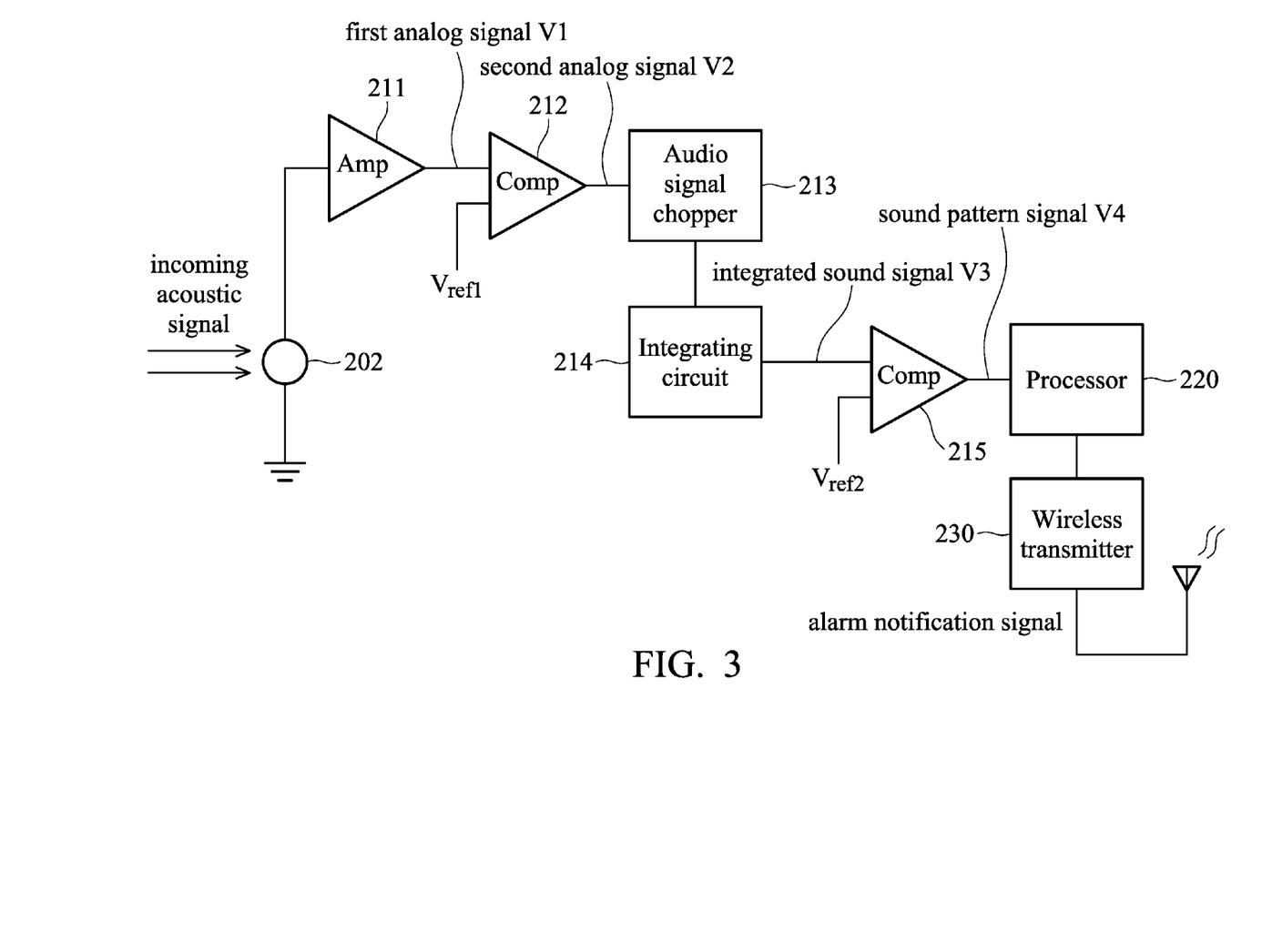
FIG. 3 is a detailed schematic diagram of the alarm detector 200 in accordance with an embodiment of the invention.
Figures 4A, 4B, 4C:
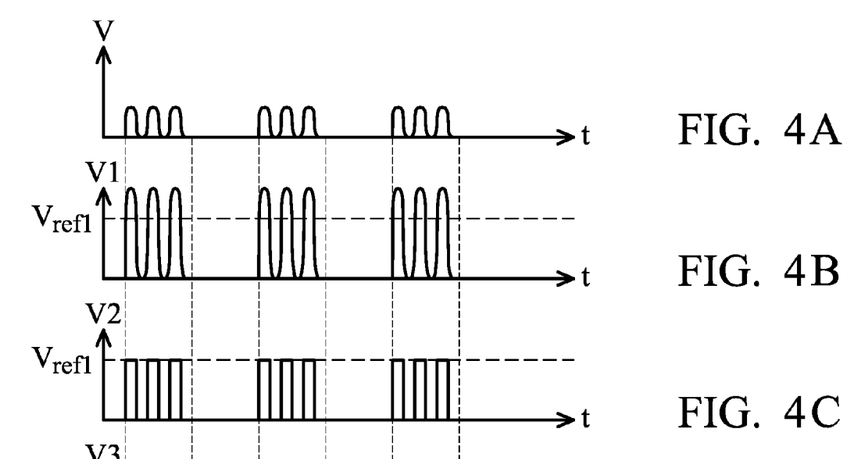
FIGS. 4A~4E are waveform diagrams of the output signal at the output of each component in the sensing circuit accordance with an embodiment of the invention.

FIG. 3 is a detailed schematic diagram of the alarm detector 200 in accordance with an embodiment of the invention. FIG. 4A is a waveform diagram of an incoming acoustic signal received by the microphone in accordance with an embodiment of the invention.

Referring to FIG. 3, the sensing circuit 210 includes an amplifier 211, a first comparator 212, an audio signal chopper 213, an integrating circuit 214, and a second comparator 215, and the corresponding output signals of the microphone and each component in the sensing circuit 210 are respectively shown in the waveform diagrams in FIGS. 4A~4E.

For example, the microphone 202 receives an incoming acoustic signal, as shown in FIG. 4A, and the amplifier 211 is configured to amplify the incoming acoustic signal received by the microphone 202 to generate a first voltage signal V1, as shown in FIG. 4B, and the first voltage signal V1 is an amplified analog signal of the incoming acoustic signal. It should be noted that the amplitude of the audible alarm generated by the smoke or CO detectors may be relatively high, so the sensitivity of the microphone 202 is usually tuned low to reject common noises having relatively low amplitude, and the amplifier 211 has to amplify the amplitude of the incoming acoustic signal to a sufficient level for further process.

Then, the first voltage signal V1 is compared with a first reference voltage $V_{ref1}$ in the first comparator 212 to generate a second voltage signal V2 which is a high sound pulse signal. When the signal level of the first voltage signal V1 is larger than or equal to the first reference voltage $V_{ref1}$, i.e. V1>$V_{ref1}$, the second voltage signal V2 output signal of the first comparator 212 is at logic "HIGH". On the other hand, when the signal level of the first voltage signal V1 is less than the first reference voltage $V_{ref1}$, i.e. V1<$V_{ref1}$, the second voltage signal V2 output by the first comparator 212 is at logic "LOW", as shown in FIG. 4C. The first comparator 212 can also be regarded as a signal filter. because either when no sound is detected, or the amplitude of the first voltage signal V1 is too small, there is no output on the first comparator 212, and thus the common noises can be filtered out.

Figure 5:
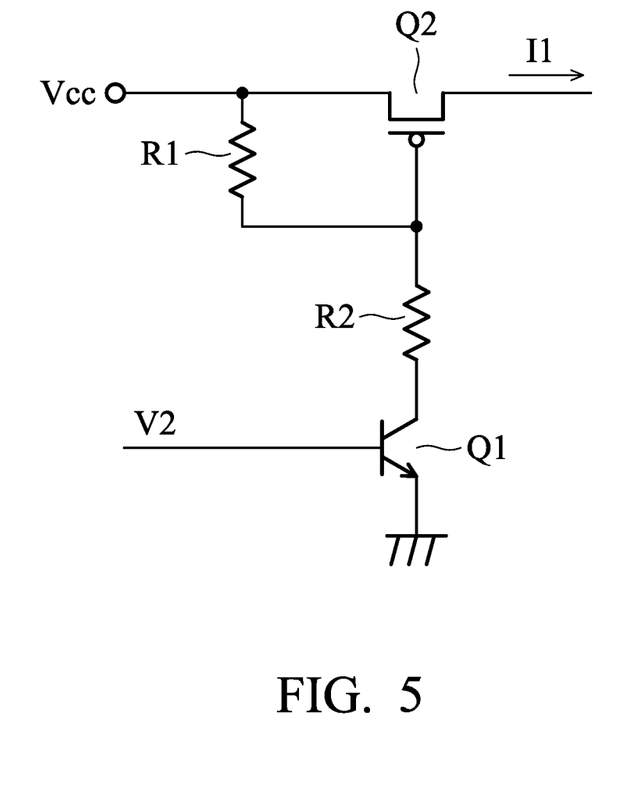
FIG. 5 is a detailed schematic diagram of the audio signal chopper in accordance with an embodiment of the invention.

The second voltage signal V2 is fed into the audio signal chopper 213, and the audio signal chopper 213 is used to convert the second voltage signal V2 that is a voltage signal into a current signal I1. Specifically, the audio signal chopper 213 is a voltage-to-current converter, where the detailed schematic diagram is shown in FIG. 5. Referring to FIG. 5, when the second voltage signal V2 is at logic HIGH, the bipolar junction transistor (BJT) Q1 is turned on, and thus there is a driving current I1 flowing into the integrating circuit 214.

Conversely, when the second voltage signal V2 is at logic LOW, the BJT Q1 is turned off, and thus there is no current flowing into the integrating circuit 214. It should be noted that the circuit of the audio signal chopper 213 in FIG. 5 is illustrated for purposes of description, and a person skilled in the art will appreciate the audio signal chopper 213 can be implemented by other circuits of the equivalent voltage-to-current function.

Figures 4D, 4E:
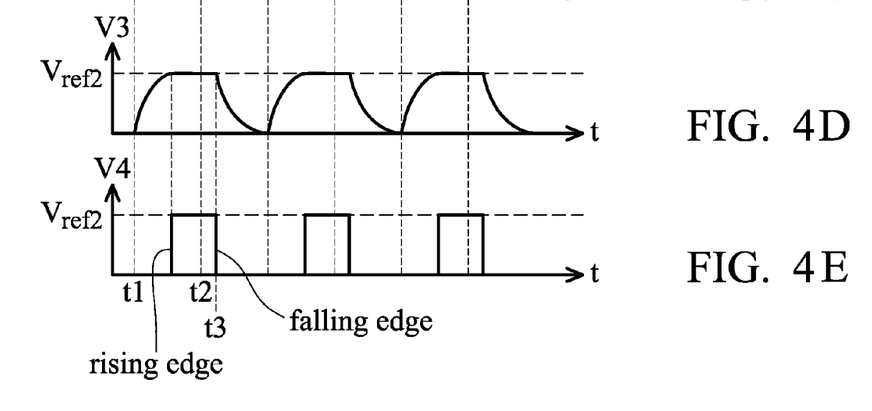

Attention now is directed back to FIG. 2 again. The integrating circuit 214 is configured to perform integration calculation on the current signal I1 from the audio signal chopper 213 over time. For example, the input of the integrating circuit 214 is a current signal I1, and output of the integrating circuit 214 is an integrated sound signal V3, as shown in FIG. 4D. Specifically, the integrating circuit 214 is implemented, for example, by a resistor-capacitor (RC) circuit capable of converting an input current signal I1 into an integrated sound signal V3, where the detailed schematic diagram of the integrating circuit 214 is shown in FIG. 6.

Figure 6:
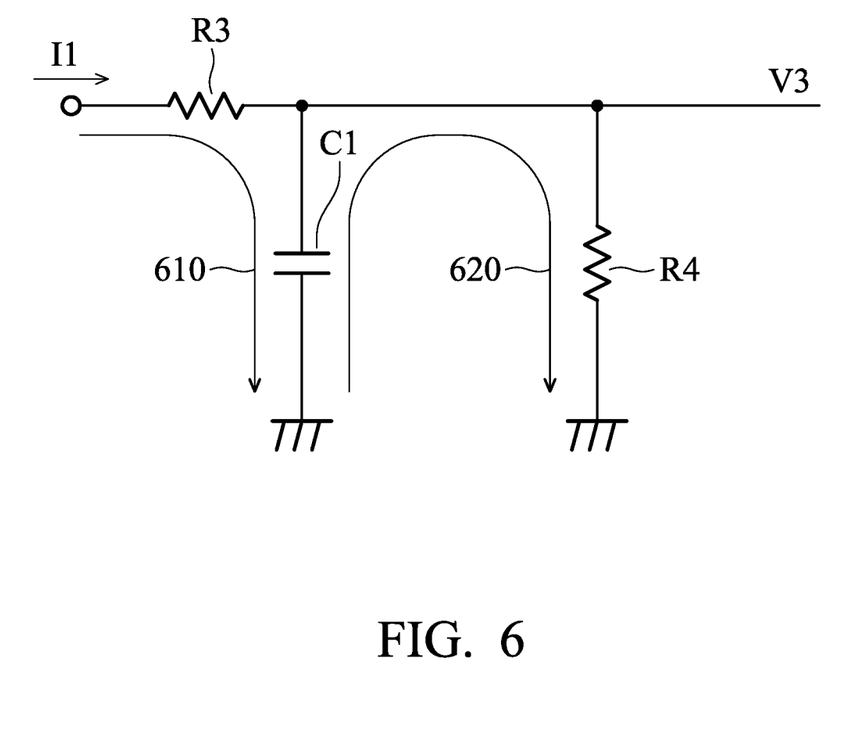
FIG. 6 is a detailed schematic diagram of the integrating circuit in accordance with an embodiment of the invention.

Referring to FIG. 6, the integrating circuit 214 is implemented by an RC circuit, where the resistance value of the resistor R4 is much larger than that of the resistor R3. For example, when the input current signal I1 flows in, the capacitor C1 is charged at a first time constant $\tau_1$ in the charging path 610, where $\tau_1=(R_3//R_4)\times C_1$. Since the resistance value of the resistor R4 is much larger than that of the resistor R3, the first time constant $\tau_1$ is approximate to $R_3C_1$. When the input current signal I1 is zero, the capacitor C1 starts to discharge through the resistor R4 via a second time constant $\tau_2$ in the discharging path 620, where $\tau_2=R_4\times C_1$.

Since the resistance value of the resistor R4 is much larger than that of the resistor R3, the second time constant $\tau_2$ is much larger than the first time constant $\tau_1$. Accordingly, the capacitor C1 is charged by the current signal I1 with a higher speed, and is discharged to the ground through the resistor R4 with a much lower speed.

Attention now is directed to FIG. 6, FIG. 4C and FIG. 4D. In FIG. 4C, when the second analog signal V2 is at logic HIGH, the current signal I1 charges the capacitor C1 in the charging path 610 in the integrating circuit 214. When second analog signal V2 is at logic LOW, the capacitor C1 starts to discharge with a very low speed in the discharging path 620. Since there are many square pulses in second analog signal V2 within the period from time t1 to time t2 (i.e. the first "high" audible pattern), the integrated sound signal V3 output by the integrating circuit 214 will be increased and decreased alternately. However, since the second time constant for discharging is much larger than the first time constant for charging. The integrated sound signal V3 keeps increasing globally within the period from time t1 to time t2. For purposes of description, the temporary decrements of the integrated sound signal V3 are omitted in FIG. 4E because it is generally a "flat" curve. It should be noted that the circuit of the integrating circuit 214 in FIG. 6 is illustrated for purposes of description, and a person skilled in the art will appreciate the integrating circuit 214 can be implemented by other circuits of the equivalent integrating function.

Attention now is directed back to FIG. 2 again. The integrated sound signal V3 from the integrating circuit 214 is compared with a second reference voltage $V_{ref2}$ by the second comparator 215 to extract a sound pattern signal V4 out of the integrated sound signal V3. The waveform of the sound pattern signal V4 is shown in FIG. 4E.

When the sound pattern signal V4 changes from logic LOW to logic HIGH, a rising edge of the sound pattern V4 will awaken the processor 220 into the working mode from the sleep mode or low-power mode to determine if the pulse width of the sound pattern signal V4 matches the pulse width of a specific alarm sound pattern (e.g. NFPA 72 or NFPA 720). When it is determined that the pulse width of the sound pattern signal V4 matches the pulse width of a specific alarm sound pattern (e.g. NFPA 72 or NFPA 720), the processor 220 may activate the wireless transmitter 230 to transmit an alarm notification signal to the control and transmission portion 120.

More specifically, the pulse width of the sound pattern signal V4 of the sensing circuit 210 shown in FIG. 4F may be shorter than the pulse width defined in the alarm protocol depending on design choice. However, the processor 220 is capable of detecting the pulse width and the intervals between each two consecutive pulses to determine whether the sound pattern signal V4 conforms to an alarm protocol.

Attention now is directed to FIG. 7 which illustrates an example of a standard smoke detector alarm audible pattern waveform in T3 pattern as defined by NFPA 72 and ANSI 53.41. Referring to FIG. 7, in the aforementioned embodiments, the goal of the sensing circuit 210 is to detect the T3 pattern defined by the NFPA 72 and ANSI 53.41 standard. There is a 0.5 second interval between the first pulse and second pulse, and between the second pulse and the third pulse, where each of the first, second, and third pulses has a duration of 0.5 seconds. It should be noted that the sensing circuit 210 is capable of detecting the T3 pattern regardless of the frequency of the sinusoidal wave within the duration of each pulse in the T3 pattern. For example, referring to FIGS. 4A~4C, the sinusoidal wave in each pulse of the incoming acoustic signal in FIG. 4A is converted into a voltage signal of square waves, as shown in FIG. 4C, for integration by the integrating circuit 214. Since the second time constant $\tau_2$ for discharging is much larger than the first time constant $\tau_1$ for charging in the integrating circuit 214, the output voltage signal V3 of the integrating circuit 214 will keep increasing globally within the duration of each pulse, as shown in FIG. 4D, since the charging speed is much faster than the discharging speed. In other words, no matter which frequency is used in the sinusoidal wave in FIG. 4A, the output voltage signal of the integrating circuit 214 will be similar.

Figure 9A:
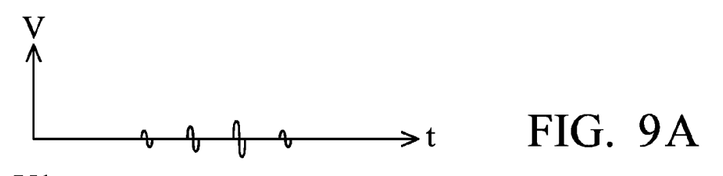
FIGS. 9A~9E are waveform diagrams of the output signal at the output of each component in the sensing circuit accordance with another embodiment of the invention.
Figures 9B, 9C:
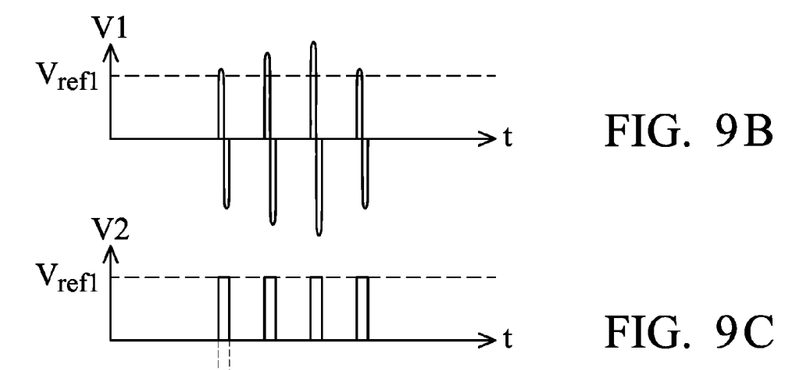
Figures 9D, 9E:
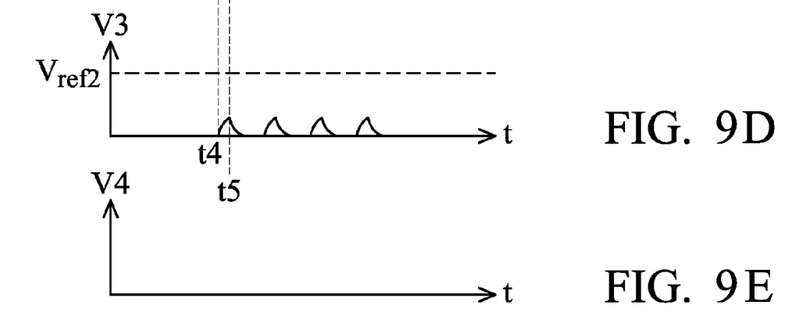

FIGS. 9A~9E are waveform diagrams of the output signal at the output of each component in the sensing circuit accordance with another embodiment of the invention. Referring to FIG. 9A, the incoming acoustic signal may include a noise, and the noise is also amplified by the amplifier 211, as shown at peak 420 in FIG. 9B. The amplitude of the amplified noise is limited to the first reference voltage $V_{ref1}$, and the portion in the amplified noise having amplitude lower than the first reference voltage $V_{ref1}$ is filtered out, as shown in FIG. 9C. For a sudden noise having higher amplitude, there is also a charging current within the duration of the noise, such as the interval from time t4 to time t5. However, as long as the duration of the noise could be relatively short, the integrated sound signal V3 cannot reach the second reference voltage $V_{ref2}$ at the duration from time t4 to time t5, as shown in FIG. 9D. Thus, the noise is completely filtered out from the incoming acoustic signal, because there is no rising edge occurred in the sound pattern signal V4 that is capable of awakening the processor 220, as shown in FIG. 9E, and the processor 220 is kept in the sleeping mode. Accordingly, the processor 220 is free from being interrupted by small noises.

In view of the above, a low-power alarm detector is provided in the invention. The alarm detector can be deployed in an alarm detection system, and has a longer battery life than a conventional one. Furthermore, the alarm detector provided in the invention is capable of detecting audible alarm patterns having different frequencies, and is also noise-tolerant.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An alarm detector for use in an alarm detection system, comprising:
   a microphone for detecting an incoming acoustic signal;
   a processor;
   a sensing circuit for determining whether the incoming acoustic signal comprises a specific audible alarm, and awakening the processor into a working mode from a sleep mode upon determining the incoming acoustic signal comprises a specific audible alarm; and
   a wireless transmitter,
   wherein the processor determines whether the specific audible alarm conforms to an alarm protocol after being awakened into the working mode, and activates the wireless transmitter to transmit an alarm notification signal to a controller in the alarm detection system when it is determined the specific audible alarm conforms to an alarm protocol,
   wherein the sensing circuit comprises:
   an amplifier, for amplifying the incoming acoustic signal to a first analog signal;
   a first comparator, for limiting amplitude of the first analog signal to a first reference voltage to generate a second analog signal;
   an audio signal chopper, for converting the second analog signal into a current signal;
   an integrating circuit, for integrating the current signal over time to output an integrated sound signal; and
   a second comparator, for limiting amplitude of the integrated sound signal to a second reference voltage to generate a sound pattern signal,
   wherein when the sound pattern signal has a rising edge, the processor is awakened to the working mode from the sleep mode in response to the rising edge of the sound pattern signal, and the processor determines whether the sound pattern signal conforms to the alarm protocol.

2. The alarm detector as claimed in claim 1, wherein the wireless transmitter transmits the alarm notification signal to the controller via a low-power wireless protocol.

3. The alarm detector as claimed in claim 1, wherein the audio signal chopper comprises:
   a bipolar junction transistor (BJT), wherein a base of the BJT is connected to the second analog signal, and an emitter of the BJT is connected to a ground, and a collector of the BJT is connected to a first node;
   a first resistor, wherein a first terminal of the first resistor is connected to a power source, and a second terminal of the first resistor is connected to a second node
   a second resistor, wherein a first terminal of the first resistor is connected to the first node, and a second terminal of the first resistor is connected to the second node; and
   a PMOS transistor, wherein a gate of the PMOS transistor is connected to the second node, and a source of the PMOS transistor is connected to the power source, and a drain of the PMOS transistor is connected to an output of the audio signal chopper.

4. The alarm detector as claimed in claim 1, wherein the integrating circuit comprises:
   a third resistor, wherein a first terminal of the third resistor is connected to the drain of the PMOS transistor of the audio signal chopper, and a second terminal of the third resistor is connected to a third node;
   a first capacitor, wherein a first terminal of the first capacitor is connected to the third node, and a second terminal of the first capacitor is connected to a ground; and
   a fourth resistor, wherein a first terminal of the fourth resistor is connected to the third node, and a second terminal of the fourth resistor is connected to the ground, wherein the third node is an output of the integrating circuit.

5. The alarm detector as claimed in claim 4, wherein resistance of the fourth resistor is much larger than that of the third resistor.

* * * * *